March 24, 1931.  R. J. LUSSE  1,798,023
AMUSEMENT CAR
Filed July 15, 1926  9 Sheets-Sheet 1

Fig. 1.

Inventor,
Robert Lusse.
by his Attorneys
Howson & Howson

March 24, 1931.  R. J. LUSSE  1,798,023
AMUSEMENT CAR
Filed July 15, 1926   9 Sheets-Sheet 2

Fig. 2.

Inventor:
Robert Lusse,
by his Attorneys.
Howson & Howson

March 24, 1931.  R. J. LUSSE  1,798,023
AMUSEMENT CAR
Filed July 15, 1926  9 Sheets-Sheet 9

Inventor,
Robert Lusse
by his Attorneys,
Howson & Howson

Patented Mar. 24, 1931

1,798,023

UNITED STATES PATENT OFFICE

ROBERT J. LUSSE, OF PHILADELPHIA, PENNSYLVANIA, ASSIGNOR TO LUSSE BROS. INC., OF PHILADELPHIA, PENNSYLVANIA, A CORPORATION OF PENNSYLVANIA

AMUSEMENT CAR

Application filed July 15, 1926. Serial No. 122,633.

My invention relates to motor vehicles and it has particular relation to such vehicles as are adapted for use in amusement parks.

Broadly speaking, the object of my invention is to provide a car of the above character that shall be characterized by simplicity of design, rigidity of construction and absence of undesirable operating noises.

A more specific object of my invention is to provide simple and efficient propelling mechanism as well as controlling apparatus therefor, especially designed to permit the occupant to turn the car within a minimum radius and otherwise control its operation.

Another object of my invention is to provide a car with power transmission mechanism between a driving motor and a traction wheel as well as control mechanism therefor, permitting a quick get-away with noiseless operation.

A further object of my invention is to provide a simple and efficient form of connection between the sections of a steering post, wherein the problem of lubrication is very greatly simplified.

A still further object of my invention is to supplement the swinging operation of the steering post with pedal mechanism, whereby the interest of the operator may be further stimulated.

A still further object of my invention is to provide in the control mechanism of the car a switch for the main driving motor so that the latter may be energized only when the operator desires to put the car in motion, thus effecting a material saving in the power consumed.

With these and other objects and applications in mind, my invention further consists in the details of construction and operation and circuit arrangement, hereinafter described and claimed and illustrated in the accompanying drawings, wherein:

In the illustrated embodiment of my invention shown in the drawing, a car body 1 comprises a platform 2, a seat 3, a supporting structure 4 for said seat, which extends upwardly from an outer edge 5 of the platform 2, and a suitable shock-resisting bumper 6 which encircles the base portion 7 of the structure 4 and is secured thereto. Opposite sides 8 and 9 of the platform 2 are provided with openings 11 and 12 through which wheels 13 and 14 respectively extend from a metallic floor surface 15. The wheels 13 and 14 are respectively provided with axles 16 and 17 supported in bearings 18 and 19 formed on opposite ends 21 and 22 of a bracket member 23. The member 23 extends transversely of the car platform 2 and is secured to an underside 24 of the platform 2 by bolts 25 so as to close partially a similarly extending recess 26 in said platform 2.

Figure 7:
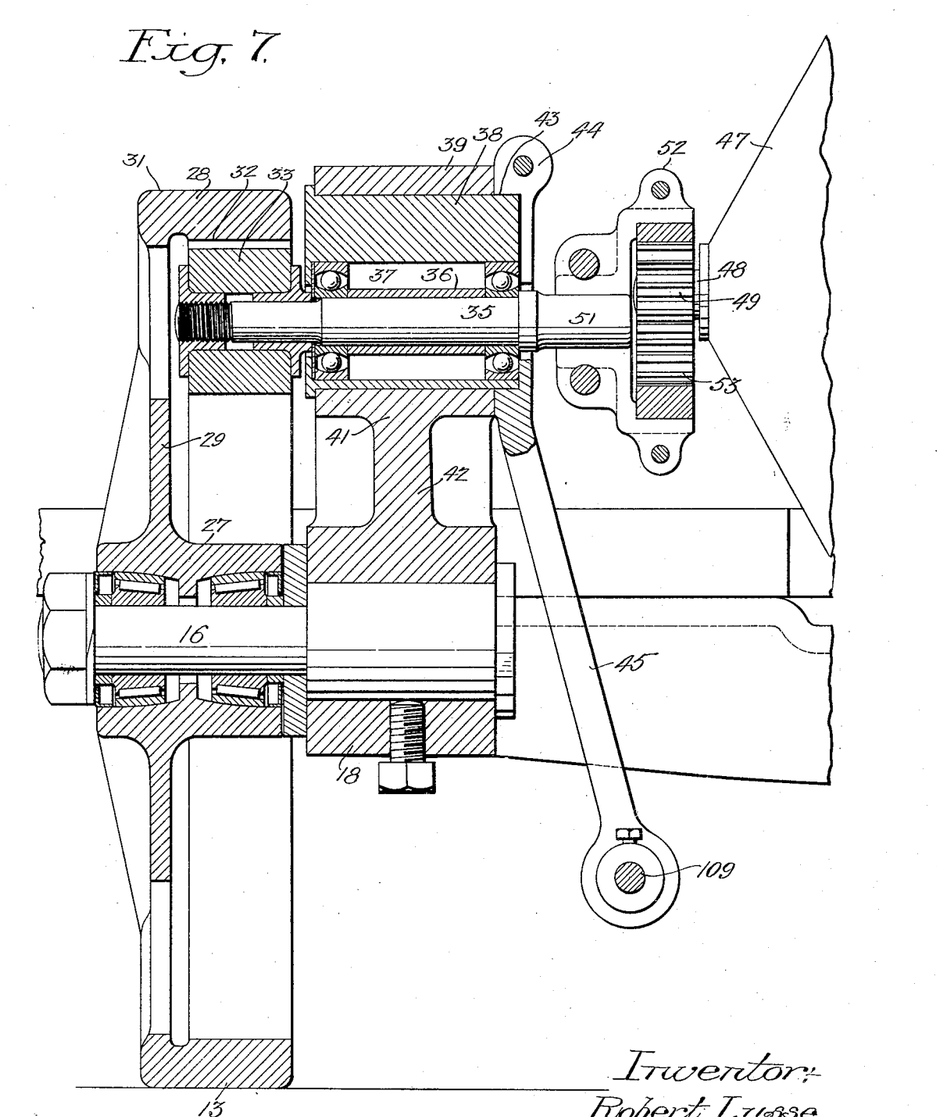
Fig. 7 is an enlarged detail transverse sectional view of the car wheel, the driving friction wheel and its associated actuating and control mechanism, the sectional plane being on the line 7—7 of Fig. 8.
Figure 8:
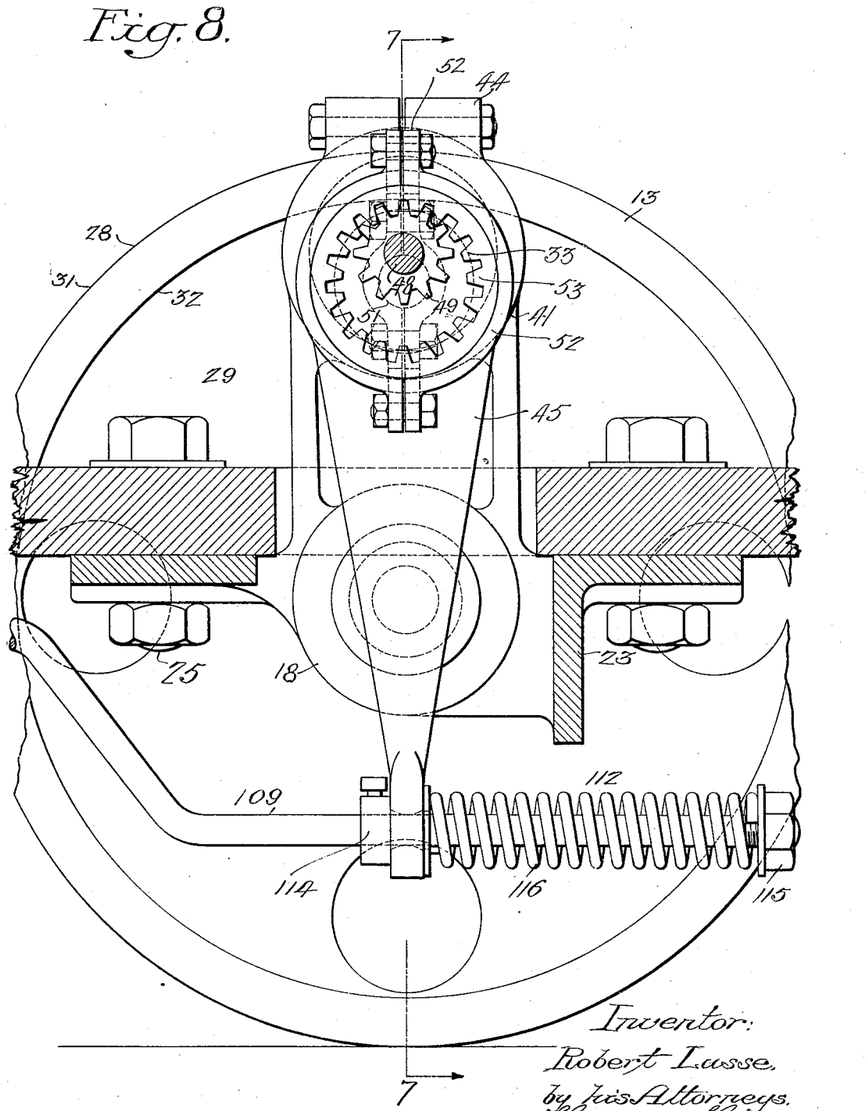
Fig. 8 is a transverse sectional view taken on the line 8—8 of Fig. 7.
Figure 9:
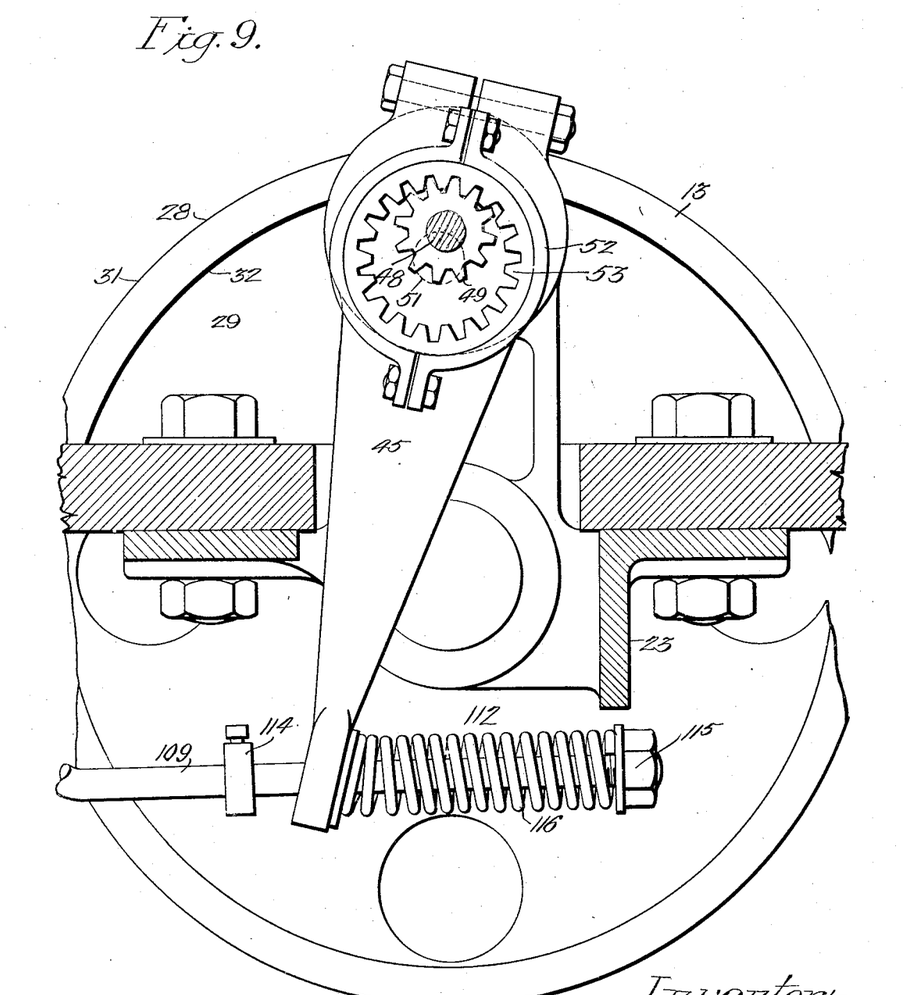
Fig. 9 is a view similar to Fig. 8, but showing the position of the parts when the frictional wheel is in engagement with the driving wheel and also illustrating the spacing between the forward abutment and the operating arm caused by the swinging of the steering post.

As illustrated in Figs. 7, 8 and 9, the car wheel 13 comprises a central hub portion 27, an outer rim 28 and an interconnecting rib portion 29. An outer side 31 of the rim 28 is adapted to engage the metallic floor surface 15, while an inner side 32 is adapted to co-act with a frictional driving element 33. The opposite car wheel 14 is similar to the car wheel 13 just described and it is also actuated by a driving friction element 34.

The frictional element 33 may be actuated relative to the car wheel 13 to vary the driving effect of the former by mounting the same on a shaft 35 which is rotatably mounted in a bearing 36 positioned in a recess 37 of a rotary member 38, the recess 37 being positioned eccentrically of the axis of the member 38. The member 38 is journalled in a bearing 39 formed on an upper end 41 of a standard 42 extending from the bracket 23 above the car platform 2. The member 38 is extended at one end beyond the bearing 39 to provide a projecting shoulder 43 to which may be removably secured one end 44 of an actuating lever 45. Thus, by reason of the eccentric position of the driving element 33 with respect to the central axis of the member 38, when the latter is actuated by the arm 45, the frictional driving element 33 is actuated into or out of engagement with the adjacent side 32 of the wheel 13, depending upon the direction of movement of the actuating arm 45. The driving element 34 on the opposite side of the car is similarly mounted, whereby the movement of an operating lever 46 may cause the engagement or disengagement of the driving element 34 with respect to the car wheel 14.

My invention contemplates means whereby the shaft section 35 may be positively actuated by a driving motor 47 for all positions of the frictional driving element 33. To this end, I provide a driving shaft 48 of the motor 47 with a pinion 49, the latter being mounted in alignment with the central axis of the rotary member 38. An adjacent end 51 of the shaft 35 carries a two-part casing 52, an inner side of which is provided with gear teeth constituting an internal gear-wheel 53 adapted to mesh with the driving pinion 49. Inasmuch as the member 38 carrying the gear wheel 53 is in alignment with the axis of the driving pinion 49, a proper working relation obtains between the two gear elements 49 and 53 for all positions of the frictional driving element 33 relative to the car wheel 13. The driving element 34 is similarly connected to a shaft 62 of the motor 47, whereby an operative connection may be maintained therebetween for all positions of said frictional driving element 34.

Figure 10:
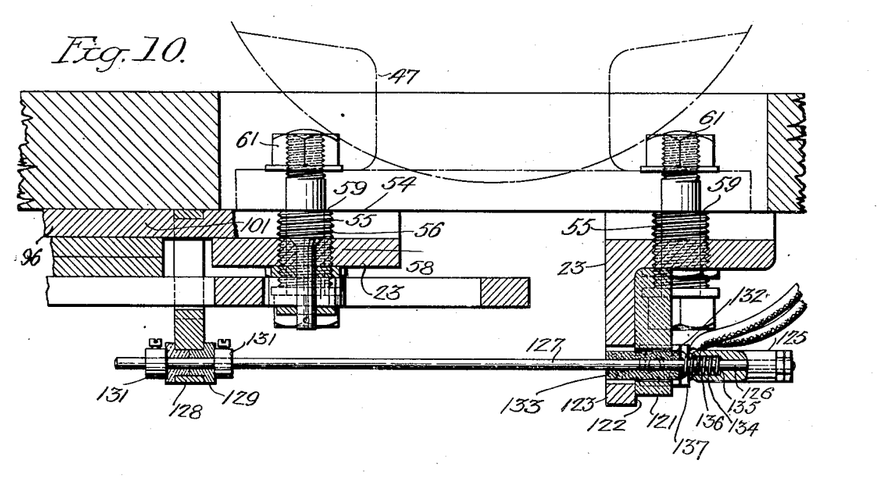
Fig. 10 is an enlarged detail transverse sectional view illustrating the adjustable support for the motor base and also the constructional details of the control switch for the motor, the sectional plane being taken on the line 10—10 of Fig. 2.

Under conditions of practical manufacture, it may be difficult to obtain a motor wherein the driving shaft 48 is exactly the desired distance from a supporting base 54 thereof. Accordingly, I provide an adjustable mounting 55 for the motor 47 whereby the driving shaft 48 may be easily and quickly brought into alignment with the rotary member 38. The adjustable means 55 comprises a plurality of tubular bushings 56, threaded outer sides 57 of which engage a complementary threaded aperture 58 in the supporting bracket member 23, as illustrated in Fig. 10. The motor 47 may be securely positioned on upper ends 59 of the bushings 56 by bolts 61.

In accordance with my invention, a rotary steering post 63 is mounted at the forward end 64 of the car and associated by mechanism 65 with the lever arms 45 and 46, whereby the frictional driving elements 33 and 34 may be rendered effective and ineffective, depending upon the position of the steering means 63, as will appear more fully hereinafter. This steering means comprises a post 66, a base section 67 of which is mounted in a casting 68 for movement about a vertical axis. The vertical base section 67 is provided with a fork 69 extending below the under surface 24 of the platform 2 so as to provide a mounting for the steering wheel 71. An upper section 72 of the steering post 66 is horizontally pivoted on one element 73 of a universal joint 74, another element 75 of which is mounted on the upper end of the post base section 67. The element 75 is shown as an upwardly extending cup-shaped member embracing the element 73 and it may retain a desired quantity of lubricant (not shown).

The universal joint 74 may be enclosed in a housing 76 extending upwardly from the platform 2 and provided with an opening 77 through which the swinging post section 72 may extend. The outlet is elongated sufficiently to permit the desired swinging movement of the post section 72 and it is of such transverse dimensions as to serve as a guide for the same during such movement. The guiding action may be increased by providing the post section 72 with a sleeve 78 having opposing flat sides 79 for co-operating with the spaced sides of the outlet 77. The upper end of the post section 72 may terminate in a handle 81.

Figure 1:
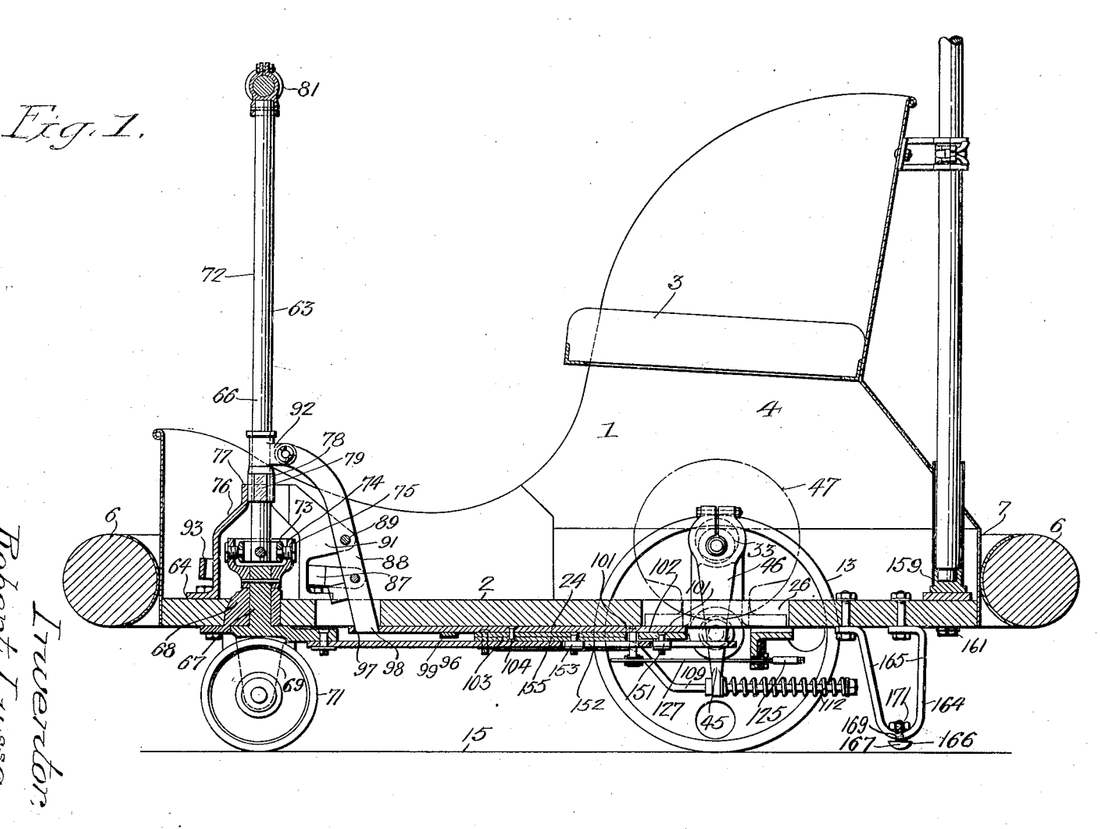
Fig. 1 is a longitudinal sectional view of a car embodying my invention.
Figure 4:
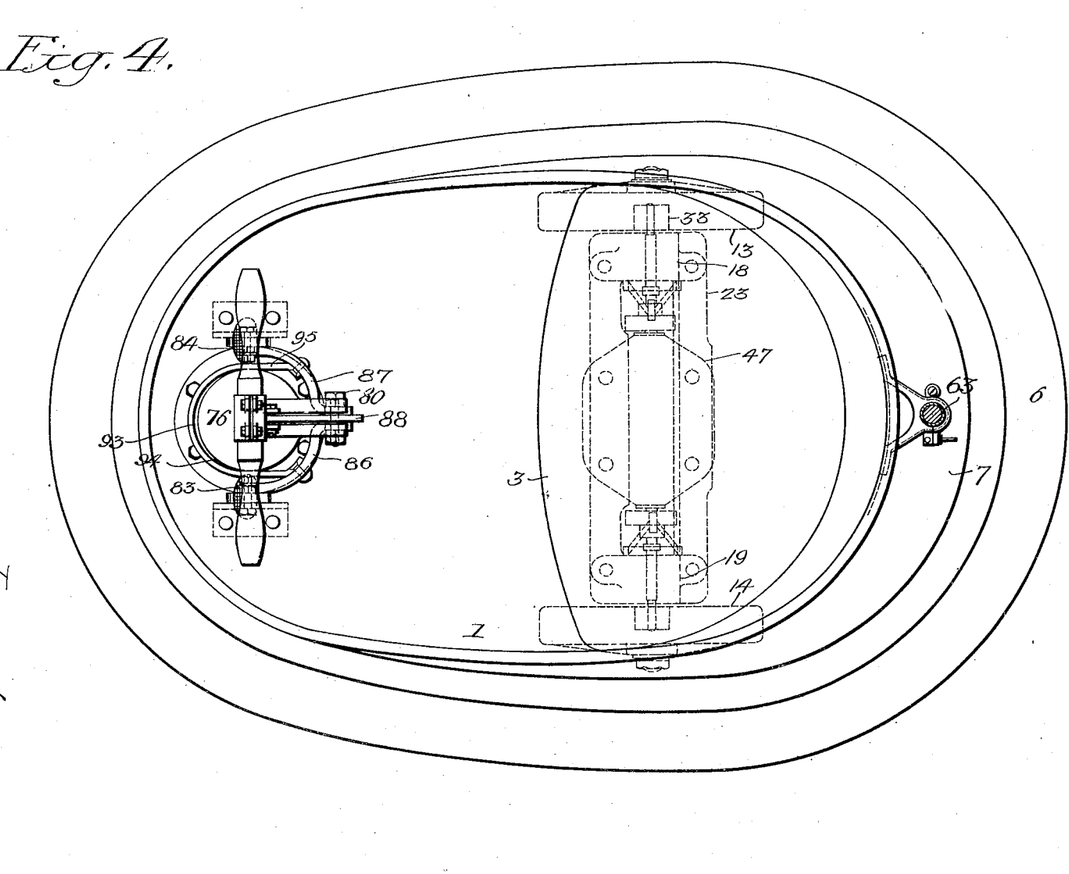
Fig. 4 is a plan view of the structure of Fig. 1, illustrating the pedal-control mechanism.
Figures 5, 6:
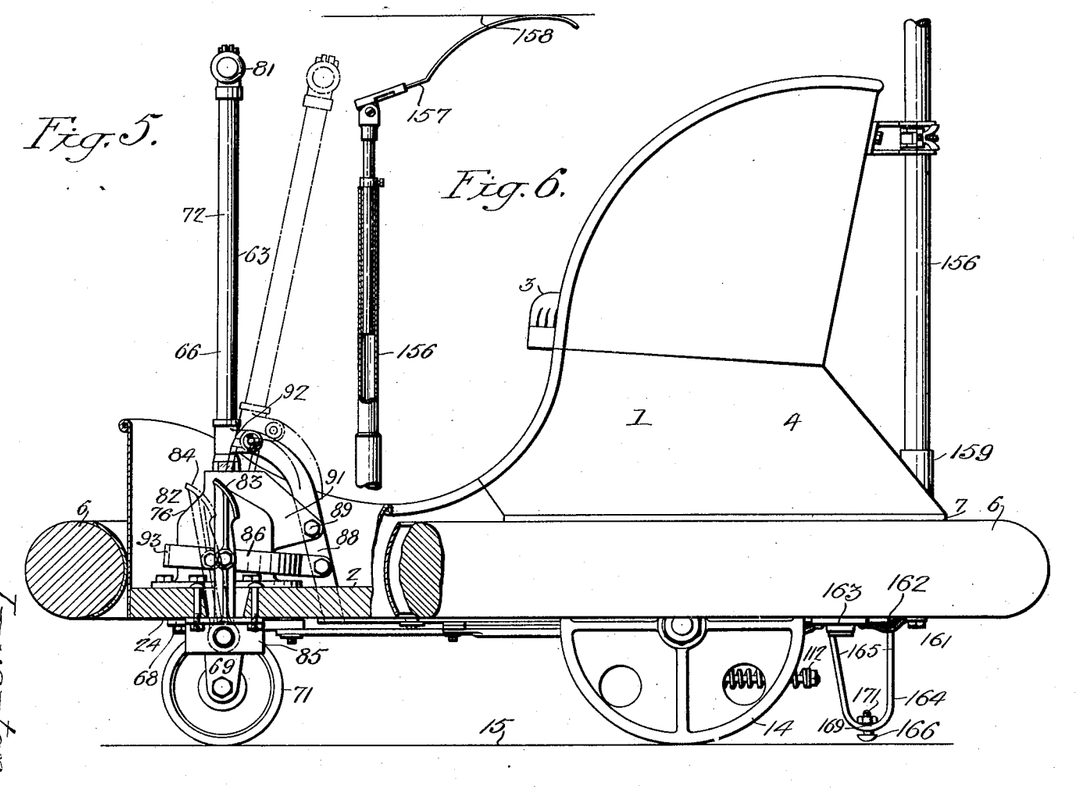
Fig. 5 is a side elevational view of the structure of Fig. 1 with a front portion of the car body broken away to illustrate further the pedal-control mechanism.
Fig. 6 is a side elevational view, partially broken away, of the upper end of the trolley pole of Fig. 5 and its associated charged ceiling.

My invention further contemplates means whereby the swinging movement of the post section 72 may be supplemented by means of pedal mechanism 82, as illustrated in Figs. 1, 4 and 5, wherein a pair of pedals 83 and 84 are pivotally mounted on brackets 85 secured to the underside 24 of the platform 2. The brackets 85 may constitute integral extensions of the bearing casting 68. The pedals 83 and 84 may be connected by arcuate members 86 and 87 to a lever 88 pivotally mounted at 89 on rearwardly spaced projections 91 of the universal housing 76. Thus, a forward movement of the pedals 83 and 84 causes a tilting of the lever 88 and consequently a rearward movement of the swinging post section 72. An upper end of the lever 88 is pivotally mounted on a sleeve 92 secured to the swinging post section 72. The pedals 83 and 84 may be further guided and the tendency for a transverse movement minimized by means of a yoke 93, opposite sides 94 and 95 of which slidably engage the housing 76 and are respectively riveted or otherwise secured to the arcuate members 86 and 87.

The mechanism 65, which connects the rotary swinging steering post 66 and the operating levers 45 and 46 for the frictional driving elements 33 and 34, comprises a strap member 96 centrally mounted on the underside 24 of the platform 2 and provided at one end with a recess 97 adapted to receive one end 98 of the pivoted lever 88, whereby said strap member 96 may be actuated longitudinally of the car upon a swinging movement of the post section 72. The strap member 96 is guided during such movement by means of a plate 99 which also serves to hold the strap 96 in position relative to the platform 2. An opposite end 101 of the strap 96 is slidably mounted on an upper side 102 of the bracket member 23, as shown in Fig. 1.

A second strap member 103 is pivotally mounted to the strap member 96 at 104 which is intermediate the ends of the member 76, and it is provided with oppositely extending arms 105 and 106 respectively providing pivotal supports 107 and 108 for corresponding ends of rods 109 and 111. Opposite ends of these rods are connected through resilient devices 112 and 113 to the operating levers 45 and 46, respectively.

The resilient device 112, which is illustrated in Figs. 7, 8 and 9, comprises front and rear adjustable abutments 114 and 115 placed on opposite sides of the arm 45 and a spring 116. The opposite ends of the spring 116 normally engage the abutment 115 and lever 45, causing the latter to engage the front abutment 114 as shown in Fig. 8. The parts are so arranged that when the steering wheel 7 is in the mid position illustrated in dot-and-dash lines in Fig. 2 and the swinging post section is in its normal ineffective vertical position, the frictional driving wheel 33 is disengaged from the car wheel 13, as shown in Fig. 7 and the arm 45 is in engagement with the abutment 114 under the force of the spring 116. The resilient device 113 is similar in all respects to the resilient device 112 just described.

When the post section 72 is actuated rearwardly, the strap member 96 is actuated forwardly, causing a corresponding movement of the member 103 against the force of springs 117 and 118, which respectively extend from the arms 105 and 106 to the platform 2. The longitudinal movement of the member 103 causes a similar movement of the rods 109 and 111 and the compression of the springs in each resilient device until the force thereof is sufficient to cause a movement of the levers 45 and 46 and the consequent engagement of the driving elements 33 and 34 with the power wheels 13 and 14, respectively. The force of each of the springs is such as to permit a predetermined movement of the frictional driving elements 33 and 34 independently of the actuating rods 109 and 111, so that during the operation just described, a space is formed between each of the front abutments 114 and its associated lever, as shown in Fig. 9. The force of the spring is also adjusted so that when the swinging post section 72 is in its rearward operating position, slippage may occur between the frictional driving elements 33 and 34 and the associated car wheels should the torque of the latter exceed a predetermined safe value.

When the swinging post section 72 is relased from its rearward position, it immediately returns to the vertical position of Fig. 1 under the force of the springs 117 and 118, and the driving frictional elements 33 and 34 move into their ineffective positions shown in Fig. 7.

Figure 11:
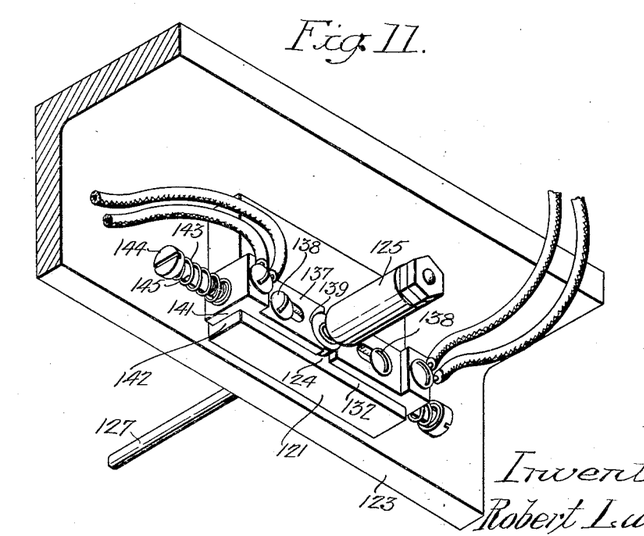
Fig. 11 is an enlarged detail perspective view of the control switch shown in Fig. 10.

A further feature of my invention is the provision of a switch 119, as particularly illustrated in Figs. 10 and 11, for controlling the operation of the main driving motor 47 in accordance with the swinging movement of the post section 72. The switch may comprise a supporting block 121 which is mounted on a rear side 122 of a depending flange section 123 of the bracket member 23. The member 121 is provided with a central aperture 124 for the removable reception of a metallic plug element 125 which is mounted on a rear end 126 of a rod 127 that extends forwardly to a supporting frame 128. The frame 128 is carried by the rear end 101 of the longitudinally movable strap member 96. The rod 127 is provided with insulating bushings 129 which are secured in position by adjustable abutments 131, so that the rod 127 may be actuated forwardly and rearwardly in accordance with the movement of the strap member 96. The movable contact member 125 is of such length that when the swinging post section 72 is in its vertical position shown in Fig. 1, the former is positioned clear of an outer surface 132 of the supporting block 121. An insulating sleeve 133 is secured to the rod 127 to insulate the portion thereof positioned within the block 121 when the contact member 125 is disposed exteriorly thereof. A spring 134 extends between the insulating sleeve 133 and a base 135 of a recess 136 in an adjacent end of the movable contact member 125, for reasons as will presently appear.

Figure 3:
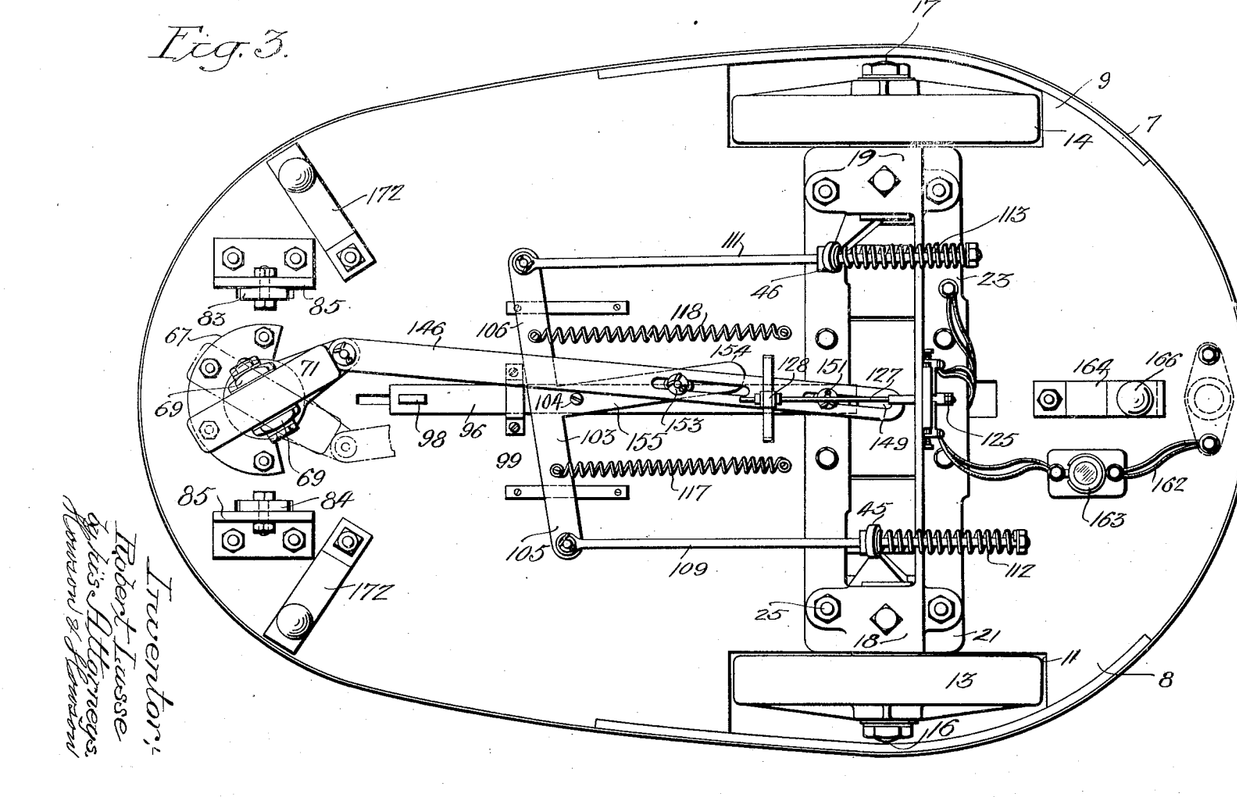
Fig. 3 is a similar view showing the effect of actuating the swinging post section.

A pair of aligned contact members 137 are slidably mounted by screws 138 on the face 132 and are provided with complementary arcuate surfaces 139 adapted to engage the curved surface of the movable contact member 125 when the latter moves from the position of Figs. 10 and 11 into the position of Fig. 3, wherein the member 125 is positioned in the aperture 124. Each contact member 137 is provided with a transversely extending end portion 141 normally resiliently maintained in engagement with an adjacent side 142 of the block 121 by means of a spring 143, opposite ends of which abut against the flange 141 and secured to the adjacent side 142.

In operation, when the swinging post section 72 is actuated rearwardly to cause a forward movement of the strap member 96 and the subsequent actuation of the frictional driving elements 33 and 34 into resilient engagement with the car wheels 13 and 14, a corresponding forward movement is imparted to the movable contact element 125 with result that the spaced contact members 137 are electrically connected together. The members 137 are so connected to the motor 47 that the latter is now energized, so that the frictional elements 33 and 34 are operated to drive the car wheels 13 and 14. The arrangement of the several parts is such that the motor circuit is completed by the movement of the contact element 125 prior to the engagement of the frictional elements 33 and 34 with cooperating car wheels 13 and 14, respectively. Thus, the motor is not required to start up under the load of the car but is subjected to load only after reaching its normal operating speed.

When the swinging post section 72 is released, it moves to its original position shown in Fig. 1, causing a rearward movement of the longitudinally extending strap member 96, and, as a result, a corresponding movement of the contact element 125 from engagement with the spaced contact members 137 to break the motor circuit. The motor is thus energized only when it is desired to have the car in motion, resulting in a material saving in power and consequent decrease in operating expense. The spring 136 is compressed during a portion of the rearward movement of the rod 127 until the force thereof is sufficient to cause the relatively movable contact element 125 to be actuated out of the aperture 124 and from between the spaced contact members 137.

The turning of the car about within a minimum radius may be accomplished by providing a lever 146, a forward end of which is pivotally secured at 147 to a rearward extension 148 of the post base section 67. A rear end of the strap member 146 is provided with a slot 149 for the reception of a shoulder 151 extending outwardly from the bracket member 123. The length of the slot 149 is determined by the desired angular movement of the steering wheel 71. Intermediate the pivotal supporting points for the lever 146, a second slot 152 is provided for the reception of a bolt 153 extending from a rear end portion 154 of a third arm 155 of the fulcrum member 103. The length of this slot is also determined by the desired angular movement of the steering wheel 71.

Figure 2:
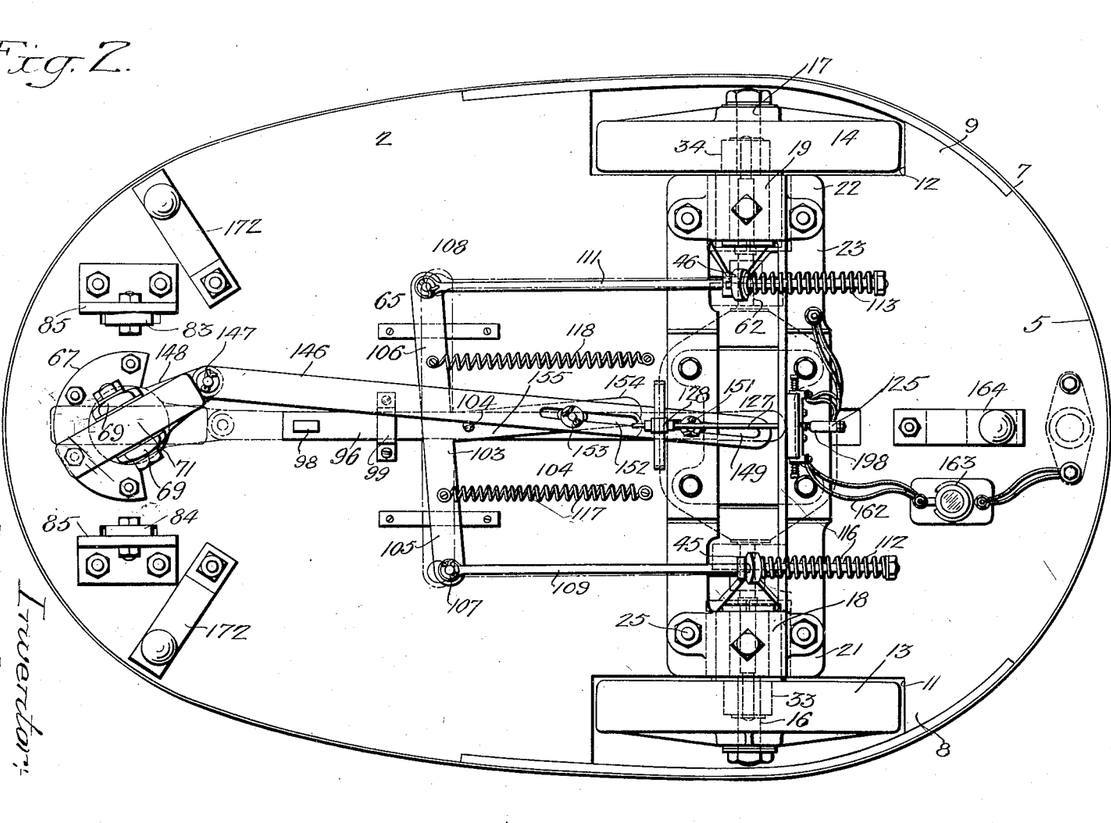
Fig. 2 is an inverted plan view of the underside of the car but illustrating the position of the control mechanism when the steering wheel is turned with the swinging post section in its normal vertical position.

In operation, when the steering wheel 71 is in the dot-and-dash line position shown in Fig. 2, the swinging post section 72 is in the vertical position shown in Fig. 1 and the fulcrum member 103 occupies the dot-and-dash line position of Fig. 2, the link 146 extending in the longitudinal plane of the car similarly to the strap member 96. Also, each of the operating arms 45 and 46 are positioned as shown in Figs. 7 and 8.

When the steering wheel 71 is turned into the solid-line position of Fig. 2, the mechanism 65 assumes the position therein shown, the rod 111 being actuated forwardly to compress the spring of the resilient device 113 and the rod 109 being actuated rearwardly to cause a rearward movement of the operating arm 45. The parts are so proportioned, however, that such movement does not cause the forwardly actuated driving element 34 to engage its car wheel 14. However, when the swinging post section 72 is actuated rearwardly, the linkage 109 and 111 are both moved forwardly, with the result that the friction element 34, which is in advance of the element 33, is the only one of these two elements actuated into engagement with its car wheel. During such movement of the element 34, prior to its engagement with the car wheel 14, the movable contact element 125 is actuated into engagement with its cooperating contact members 137 to cause the energization of the motor 47. As a result, when the friction element 34 finally engages its car wheel 14, the motor is operating at normal speed. The car now traverses a circular path, turning about the car wheel 13 as a pivot.

Should the steering wheel 71 be now actuated into the dot-and-dash line position shown in Fig. 3 with the post section 72 drawn back, the member 103 is tilted in the opposite direction, causing the disengagement of the driving element 34 from the car wheel 14, and the engagement of the driving element 33 with the car wheel 13, without affecting the movable switch element 125. The car now moves about the wheel 14 as a pivot and traverses another circular path. When the swinging post section 72 is released, it is actuated by the springs 117 and 118 into its normal vertical position, causing a rearward movement of the strap member 96, so that the movable contact element 125 is actuated to deenergize the motor 127 and the driving friction element 33 is also disengaged from the car wheel 13, the parts, with the exception of the switch element 125, finally assuming a position just opposite to that shown in Fig. 2.

The energization of the motor 47 may be brought about by a trolley pole section 156 having contact mechanism 157 for engagement with a charged ceiling 158. The pole 156 may comprise a single member having a socket 159 supported on a rear end of the platform 2 and correspondingly connected by a bolt 161 and wiring 162 with one of the spaced contact members 137, the other of which is connected to the motor 47. A manually operable switch 163 of the push-button type may be employed as an auxiliary control.

Under conditions of operation, it has been found that there is a tendency for the car to tilt upon sudden engagement with another car. To minimize this tendency, I provide a caster 164 at a central longitudinal point on the car but adjacent to the rear end thereof. The caster may comprise a bracket member having spaced legs 165 bolted to the underside of the car and also includes an adjustable abutment 166. The latter may take the form of a curved body 167 which is provided with a bolt section 168 extending through a threaded base section 169 of the member 164 and further secured by means of a nut 171. Similar casters 172 may be mounted on the forward end of the car, as shown in Fig. 2 of the drawing.

While I have shown only one form of embodiment of my invention, for the purpose of describing the same and illustrating its principles of construction and operation, it is apparent that various changes and modifications may be made therein without departing from the spirit of my invention, and I desire, therefore, that only such limitations shall be imposed thereon as are indicated in the appended claims or as demanded by the prior art.

I claim:—

1. In combination, a car wheel, a driving motor having a shaft, a rotary member in axial alignment with the motor shaft and adapted to support a shaft eccentrically mounted with respect thereto, a driving element mounted on said eccentric shaft, a gear-wheel also mounted on said eccentric shaft and meshing with a gear on said motor shaft, and means for actuating said rotary member to cause said driving element to engage said car wheel.

2. In a structure of the class described, the combination of a car wheel, a driving motor having a shaft, a rotary member mounted in axial alignment with said motor shaft, a second shaft mounted eccentrically of said rotor member, a driving member mounted on said eccentric shaft adjacent and in co-operative relation to said car wheel, an internal gear-wheel also mounted on said eccentric shaft, and a co-acting gear-wheel mounted on said motor shaft.

3. In combination, a car wheel, a driving motor having a pinion, a movable member mounted in axial alignment with said pinion, a shaft carrying a driving element so mounted on said member that a movement thereof causes said element to engage or disengage said car wheel, and a gear-wheel for said shaft positioned to mesh with said pinion.

4. A car body having a driving motor provided with a pinion, a member movable about an axis in alignment with said pinion, a shaft carried by said member eccentrically of said axis, a car wheel, a driving element mounted on said shaft in co-operative relation to said car wheel, an internal gear-wheel so positioned on said shaft as to co-operate with said pinion, and an arm extending from said member adapted to actuate the same.

5. In combination, a car wheel, a movable member having an eccentrically disposed shaft, a driving element mounted on said shaft in co-operative relation to said car wheel, an arm extending from said movable member, steering means, and means operatively connecting said arm and said steering means and responsive to said steering means for establishing a resilient engagement between said element and said car wheel, said connecting means permitting the independent operation of the driving element when the torque exerted by the car wheel exceeds a desired value.

6. A car body having a traction wheel, a driving motor, a movable member mounted with its axis in alignment with said driving motor, driving means for said wheel carried by said member eccentrically of the axis of said member and connected to said driving motor, steering means, and means operatively connecting said movable member to said steering means and responsive to a movement of said steering means for causing the actuation of said member, said connecting means including a resilient lost-motion device, permitting a pre-determined relative movement between said driving means and said steering means.

7. A car body, a pair of movable members, driving elements respectively carried by said members but disposed eccentrically of the axis thereof, steering means including a swinging post section, pedal mechanism connected to said swinging post section to facilitate said swinging movement, and mechanism operatively connecting said swinging post section to said movable members for causing the actuation of said driving elements, said mechanism including a resilient lost-motion device permitting said elements to have a predetermined relative movement.

8. A car body, a car wheel, a driving motor having a shaft, a rotary member mounted in axial alignment with said motor shaft, a shaft carried by said rotary member eccentrically of said motor shaft, a driving element on said eccentric shaft in co-operative relation with and adjacent to said car wheel, and means operable in a plane substantially at right angles to both of said shafts whereby said eccentric shaft may be connected to said motor shaft for all positions of the former.

9. A car having a pair of traction wheels, a pair of driving members adapted to co-operate with said wheels respectively, a pair of movable members respectively supporting said driving members, steering means, means operatively connecting said steering means to said movable members for effecting in response to one predetermined movement of the steering means a simultaneous application of said driving members to the wheels with which said driving members respectively co-operate, and means responsive to another predetermined movement of the steering means for effecting independent movements of said driving members relative to the wheels with which said driving members respectively co-operate.

10. In combination, a driving wheel, a driving element therefor movable into effective and ineffective positions with respect to said driving wheel, a movable support for said driving element, a driving motor operatively connected to said driving element, steering means having a plurality of movements, means connecting said movable support and said steering means, said connecting means being responsive to one of said movements of said steering means for causing the actuation of said driving element from its ineffective position to its effective position, means operatively connected to said steering means and actuated by said movement thereof for causing the energization of said motor as said driving element moves between said positions, and means operatively associated with said connecting means and responsive to another movement of said steering means for oppositely actuating said driving element.

11. In combination, a driving wheel, a driving element therefor movable into effective and ineffective positions with respect to said driving wheel, a movable support for said driving element, a driving motor operatively connected to said driving element, steering means having a plurality of movements, means connecting said movable support and said steering means, said connecting means being responsive to one of said movements of said steering means for causing the actuation of said driving element from its ineffective position to its effective position, means operatively connected to said steering means and actuated by said movement thereof causing the energization of said motor as said driving element moves between said positions, and means operatively associated with said connecting means and responsive to another movement of said steering means for oppositely actuating said driving element, said motor energizing means being substantially unaffected by the operation of the means effecting said opposite actuation of the driving element.

12. In combination, a pair of driving wheels, a pair of driving elements for said wheels respectively, a driving motor operatively connected to said driving elements, movable supports for said driving elements, steering means having a plurality of movements, means connecting said steering means and said movable supports and responsive to one of the movements of said steering means for causing bodily movement of said elements in one direction, means operatively connected to said steering means and responsive to said movement thereof for causing the energization of the said motor, and means associated with said connecting means and responsive to another movement of said steering means for oppositely moving said driving elements.

13. In combination, a pair of driving wheels, a pair of driving elements therefor movable into effective and ineffective positions, movable supports for said driving elements, a motor operatively connected to said driving elements, steering means having a plurality of movements, means connecting said steering means to said movable supports and responsive to one of the movements of the steering means for causing actuation of said driving elements into their effective positions, means operatively connected to said steering means for causing the energization of said motor upon said movement of the driving elements, and means associated with said connecting means and responsive to the other movement of the steering means for actuating one of said driving elements into an ineffective position.

14. In combination, a pair of driving wheels, a pair of driving elements therefor movable into effective and ineffective positions, movable supports for said driving elements, a motor operatively connected to said driving elements, steering means having a plurality of movements, means connecting said steering means to said movable supports and responsive to one of the movements of the steering means for causing actuation of said driving elements into their effective positions, means operatively connected to said steering means for causing the energization of said motor upon said movement of the driving elements, and means associated with said connecting means and responsive to the other movement of the steering means for actuating one of said driving elements into an ineffective position, the said motor energizing means being substantially unaffected by the means for moving the driving element into an ineffective position.

15. In combination, a pair of driving wheels, a pair of driving elements for said wheels movable into effective and ineffective positions, movable supports for said driving elements, a driving motor operatively connected to said driving elements, steering means having differential movements, foot operated mechanism operatively connected to said steering means for effecting one of said movements thereof, means connecting said steering means to said movable supports and responsive to the said movement of the steering means for causing operation of the driving elements from an ineffective position to an effective position, means operatively connected to the steering means for causing the energization of the motor prior to a movement of the driving elements into their effective position, and means associated with the said connecting means and responsive to another movement of the steering means for varying the driving effect of the driving elements.

16. In combination, a pair of driving wheels, a pair of driving elements for said wheels movable into effective and ineffective positions, movable supports for said driving elements, a driving motor operatively connected to said driving elements, steering means having differential movements, foot operated mechanism operatively connected to said steering means for effecting one of said movements thereof, means connecting said steering means to said movable supports and responsive to the said movement of the steering means for causing operation of the driving elements from an ineffective position to an effective position, means operatively connected to the steering means for causing the energization of the motor prior to a movement of the driving elements into their effective position, means associated with the said connecting means and responsive to another movement of the steering means for varying the driving effect of the driving elements, and means forming part of said connecting means for providing for a predetermined movement of each of said driving elements relative to said steering means.

17. A car having a traction wheel, a driving element therefor movable between an effective and an ineffective position relative to said wheel, a movable support for said driving element, steering means, means operatively connecting said movable support and said steering means and responsive to a movement of said steering means for causing a movement of said support to bring said driving element into its effective position relative to said traction wheel, said connecting means comprising a bar operatively connected to said steering means and movable longitudinally thereby when said movement of the steering means is effected, and a resilient lost-motion device operatively connecting said bar and said movable support and permitting a predetermined relative movement between said steering means and said movable support for said driving means.

18. A car having a traction wheel, a driving element therefor movable between an effective and an ineffective position relative to said wheel, a movable support for said driving element, steering means movable to a plurality of positions, means operatively connecting said movable support and said steering means and responsive to a movement of said steering means for causing a movement of said support to bring said driving element into its effective position relative to said traction wheel, said connecting means comprising a bar operatively connected to said steering means and movable longitudinally thereby when said movement of the steering means is effected, a rocker pivotally mounted on said bar, a resilient lost-motion device operatively connecting said rocker and said movable support, and a second bar pivotally connected at one end to said steering means, at its opposite end to said car, and intermediate its ends to said rocker for varying the extent of engagement between the driving element and the traction wheel upon another movement of the steering means.

19. A car having a pair of traction wheels, a driving element for each traction wheel, a movable support for each driving element permitting the movements of said driving elements between effective and ineffective positions relative to said traction wheels, steering means movable to a plurality of positions, a bar operatively connected to said steering means and movable longitudinally thereby to move said supports in a manner to bring said driving elements into their effective positions, a rocker pivotally mounted on said bar, a resilient lost-motion device connecting each of said movable supports with said rocker, a second bar pivotally connected at one end to said steering means, having a slidably pivotal connection with said car adjacent the opposite end of said second bar, and a pivotal connection with said rocker intermediate the opposite ends of said second bar, said second bar being responsive to another movement of said steering means to effect differential engagement of the driving elements relative to the traction wheels.

20. A car having a pair of traction wheels, a driving element for each traction wheel, a movable support for each driving element permitting said driving elements to be moved between effective and ineffective positions relative to said traction wheels, steering means having a pivotal movement and a swinging movement, a bar slidably mounted on said car, means for connecting said bar to said steering means so as to move said bar longitudinally by a swinging movement of said steering means, a rocker arm pivoted intermediate its ends to said slide bar, resilient lost-motion devices operatively connecting the opposite ends of said rocker arm with the said movable supports respectively, a second bar pivotally connected to said steering means at one end and having a pivotal slidable connection with said car at the opposite end of the said second bar, said second bar being pivotally connected intermediate its ends to said rocker arm, said second bar being responsive to a pivotal movement of said steering means to rock said rocker arm about its pivot for effecting differential engagement of the driving elements relative to the traction wheels.

21. A car having a pair of traction wheels, a driving element for each traction wheel, a movable support for each driving element permitting said driving elements to be moved between effective and ineffective positions relative to said traction wheels, hand operated steering means having a pivotal movement and a swinging movement, pedal mechanism operatively connected to the steering mechanism for facilitating the swinging movement thereof, a bar slidably mounted on said car, means for connecting said bar to said steering means so as to move said bar longitudinally by a swinging movement of said steering means, a rocker arm pivoted intermediate its ends to said slide bar, resilient lost-motion devices operatively connecting the opposite ends of said rocker arm with the said movable supports respectively, a second bar pivotally connected to said steering means at one end and having a pivotal slidable connection with said car at the opposite end of the said second bar, said second bar being pivotally connected intermediate its ends to said rocker arm, said second bar being responsive to a pivotal movement of said steering means to rock said rocker arm about its pivot for effecting differential engagement of the driving elements relative to the traction wheels.

22. A car having a pair of traction wheels, a driving element for each traction wheel, a movable support for each driving element permitting said driving elements to be moved between effective and ineffective positions relative to said traction wheels, a driving motor operatively connected to said driving elements, steering means having a pivotal movement and a swinging movement, a bar slidably mounted on said car, means for connecting said bar to said steering means so as to move said bar longitudinally by a swinging movement of said steering means, a rocker arm pivoted intermediate its ends to said slide bar, resilient lost-motion devices operatively connecting the opposite ends of said rocker arm with the said movable supports respectively, means operatively connected to said bar and operable by the longitudinal movement thereof for causing the energization of said motor when the swinging movement of the steering means is effected, a second bar pivotally connected to said steering means at one end and having a pivotal slidable connection with said car at the opposite end of the said second bar, said second bar being pivotally connected intermediate its ends to said rocker arm, said second bar being responsive to a pivotal movement of said steering means to rock said rocker arm about its pivot for effecting differential engagement of the driving elements relative to the traction wheels, said motor energizing mechanism being substantially unaffected by the pivotal movement of the steering means.

ROBERT J. LUSSE.